United States Patent
Gupte et al.

(10) Patent No.: US 10,296,952 B2
(45) Date of Patent: May 21, 2019

(54) FULFILLMENT OF CLOUD SERVICE USING MARKETPLACE SYSTEM

(71) Applicant: HEWLETT PACKARD ENTERPRISE DEVELOPMENT LP, Houston, TX (US)

(72) Inventors: Prashant Gupte, Sunnyvale, CA (US); Stephane Herman Maes, Fremont, CA (US); Ivan Pasqualini, Milan (IT)

(73) Assignee: Hewlett Packard Enterprise Development LP, Houston, TX (US)

( * ) Notice: Subject to any disclaimer, the term of this patent is extended or adjusted under 35 U.S.C. 154(b) by 479 days.

(21) Appl. No.: 14/929,264

(22) Filed: Oct. 31, 2015

(65) Prior Publication Data

US 2016/0125489 A1     May 5, 2016

Related U.S. Application Data

(60) Provisional application No. 62/074,310, filed on Nov. 3, 2014.

(51) Int. Cl.
   G06Q 30/00     (2012.01)
   G06Q 30/06     (2012.01)
   H04L 29/08     (2006.01)

(52) U.S. Cl.
   CPC ..... *G06Q 30/0603* (2013.01); *G06Q 30/0623* (2013.01); *H04L 67/10* (2013.01); *H04L 67/1095* (2013.01); *H04L 67/2833* (2013.01)

(58) Field of Classification Search
   CPC .......................................... G06Q 30/06–30/08
   USPC ............................................... 705/26.1–27.2
   See application file for complete search history.

(56) References Cited

U.S. PATENT DOCUMENTS

| 9,037,692 | B2 | 5/2015 | Ferris |
| 9,229,795 | B2 | 1/2016 | Maes et al. |
| 2005/0010458 | A1 | 1/2005 | Holloway et al. |
| 2006/0178893 | A1 | 8/2006 | McCallie et al. |
| 2007/0074225 | A1 | 3/2007 | Viertola et al. |
| 2008/0046929 | A1* | 2/2008 | Cho ............ H04N 7/17318 725/46 |
| 2009/0300635 | A1 | 12/2009 | Ferris |

(Continued)

FOREIGN PATENT DOCUMENTS

WO     WO-2015065454 A1     5/2015

OTHER PUBLICATIONS freemarker.org—Freemarker—Overview, Oct. 2014 (2 pages).

(Continued)

*Primary Examiner* — Ethan D Civan
(74) *Attorney, Agent, or Firm* — Brooks, Cameron & Huebsch, PLLC

(57) ABSTRACT

In some examples, a marketplace system receives information from multiple service providers as part of onboarding of the multiple service providers with the marketplace system. Responsive to the onboarding, a cloud service created by the respective service provider is synchronized with the marketplace system. A marketplace catalog is linked with catalogs of the service providers, the linking including aggregating content of the catalogs into the marketplace catalog. Responsive to a request from a requester received through a portal of the marketplace system, at least one cloud service is identified using the marketplace catalog based on at least one search criterion of the request.

21 Claims, 5 Drawing Sheets

(56) References Cited

U.S. PATENT DOCUMENTS

| | | | |
|---|---|---|---|
| 2010/0131624 A1* | 5/2010 | Ferris | G06F 9/5072 |
| | | | 709/221 |
| 2011/0125823 A1* | 5/2011 | Macken | G06F 9/542 |
| | | | 709/201 |
| 2011/0314165 A1 | 12/2011 | Maes et al. | |
| 2013/0254376 A1 | 9/2013 | Kudikala et al. | |
| 2015/0073960 A1 | 3/2015 | Santhi et al. | |
| 2015/0161681 A1 | 6/2015 | Maes et al. | |
| 2015/0163179 A1 | 6/2015 | Maes et al. | |
| 2015/0178805 A1* | 6/2015 | Curry, Jr. | G06Q 30/08 |
| | | | 705/26.41 |

OTHER PUBLICATIONS

Hewlett-Packard, Universal Data Model (UDM) Overview dated on or before Nov. 13, 2014 (1 page).
https://marketplace.computenext.com/, Computenext Global Cloud Marketplace, Sep. 10, 2014, 6 pages.
Martin Fowler, Microservices, Mar. 25, 2014 (16 pages).
opengroup.org—IT4IT FAQ—The Open Group Blog, Feb. 2-5, 2015 (3 pages).
PRweb, Switch Supernap Partners with ComputeNext to Power Cloud Marketplaces, Dec. 18, 2013, PRweb News Center, 5 pages.
Srikanth et al., IBM, DeveloperWorks, Schools Interoperability Framework and SOA—An interoperability bridge, Mar. 15, 2011 (14 pages).
Wikipedia, RabbitMQ dated on or before Nov. 13, 2014 (4 pages).
www.mulesoft.com—Understanding Enterprise Application Integration—The Benefits of ESB for EAI dated on or before Nov. 2014 (6 pages).

* cited by examiner

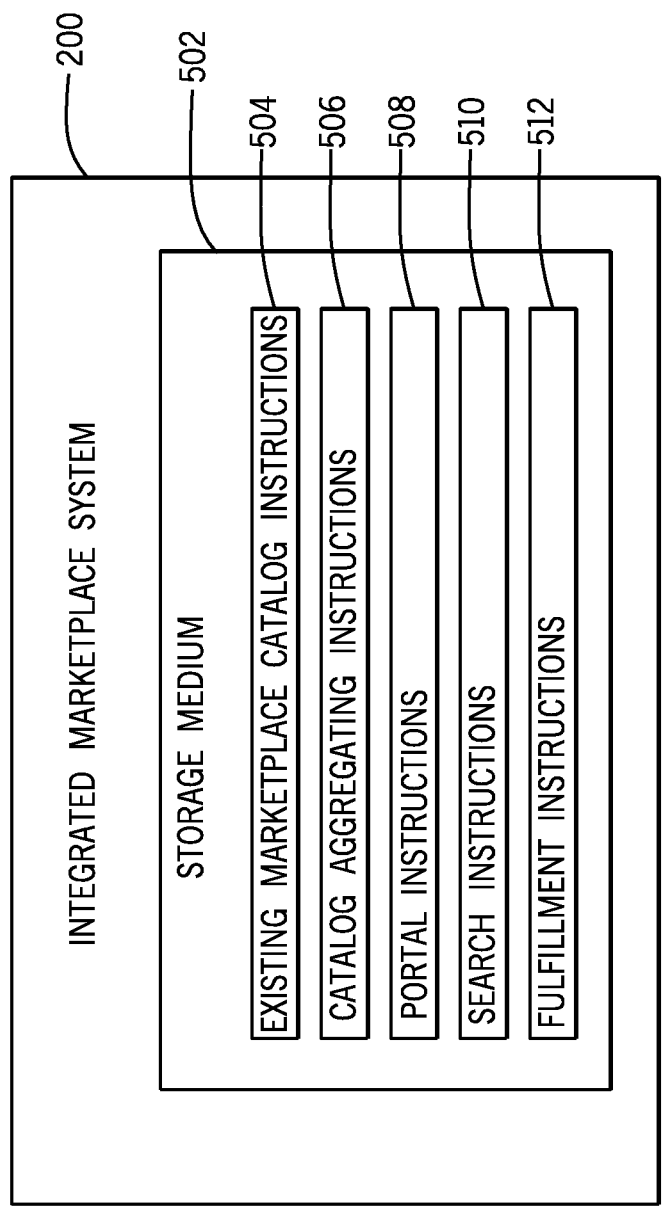

FULFILLMENT OF CLOUD SERVICE USING MARKETPLACE SYSTEM

CROSS-REFERENCE TO RELATED APPLICATION

This claims the benefit under 35 U.S.C. § 119(e) of U.S. Provisional Application No. 62/074,310, filed Nov. 3, 2014, which is hereby incorporated by reference.

BACKGROUND

A cloud service can refer to a service that includes infrastructure resources (a compute resource, a storage resource, a networking resource, etc.) connected with each other and/or platforms. Such infrastructure resources can collectively be referred to as "cloud resources." A host (also referred to as a cloud service provider) may, as examples, provide Software as a Service (SaaS) by hosting applications or other machine-readable instructions; Infrastructure as a Service (IaaS) by hosting equipment (servers, storage components, network components, etc.); or a Platform as a Service (PaaS) by hosting a computing platform (operating system, hardware, storage, and so forth).

A public cloud is a place where IaaS or PaaS is offered by a cloud service provider. The services of the public cloud can be used to deploy applications. In other examples, a public cloud can also offer SaaS, such as in examples where the public cloud offers the SaaS as a utility (e.g. according to a subscription or pay as you go model).

In other examples, an IaaS can be deployed on premises of a customer, such as the customer's data center. Such an arrangement is referred to as a private cloud. A managed cloud is a private cloud that is managed by a third party or hosted and managed by a third party (if the private cloud is managed by a third party, then the managed cloud is referred to as a virtual private cloud).

In further examples, IaaS can be provided by traditional servers or data centers.

In other cases, a cloud used by a project or a customer can be a combination of all the above (e.g. applications have pieces in different cloud deployments or applications can be moved to different clouds or deployment models). Such a cloud is referred to as a hybrid cloud.

Application stacks (including a platform and operating system as well as other layers) in a cloud infrastructure can also be considered as cloud services. They may be "used" or offered as a service.

BRIEF DESCRIPTION OF THE DRAWINGS

Some implementations are described with respect to the following figures.

FIGS. 4 and 5 are block diagrams of example systems according to various implementations.

DETAILED DESCRIPTION

A "service provider" can refer to a business concern, an educational organization, a government agency, an individual, or any other entity, that offers (sells or offers for free) cloud services to others. Cloud services offered by a service provider can be referred to as "offerings," which can be presented to users who can order such offerings.

A service provider in a first geographic region (e.g. a first country) can struggle to reach customers in a second geographic region (e.g. a second country) due, for example, to lack of marketing reach of the service provider in the second geographic region. As a result, the addressable market and revenue potential of the service provider can be restricted.

In accordance with some implementations of the present disclosure, an integrated marketplace system is provided to present offerings of multiple service providers to customers wherever the customers are located. Although reference is made to extending the reach of service providers to customers at different locations, it is noted that techniques or systems according to some implementations of the present disclosure can achieve other goals or purposes. The integrated marketplace system is able to onboard different service providers, where onboarding can include signing up the service providers and delivering tools to the service providers to allow the service providers to present their offerings (cloud services) through the integrated marketplace system, and also to perform updates of the offerings in response to updates at the marketplace system. Also, the marketplace system provides search capabilities to allow customers to use the marketplace system to search for offerings of the service providers.

Figure 1:
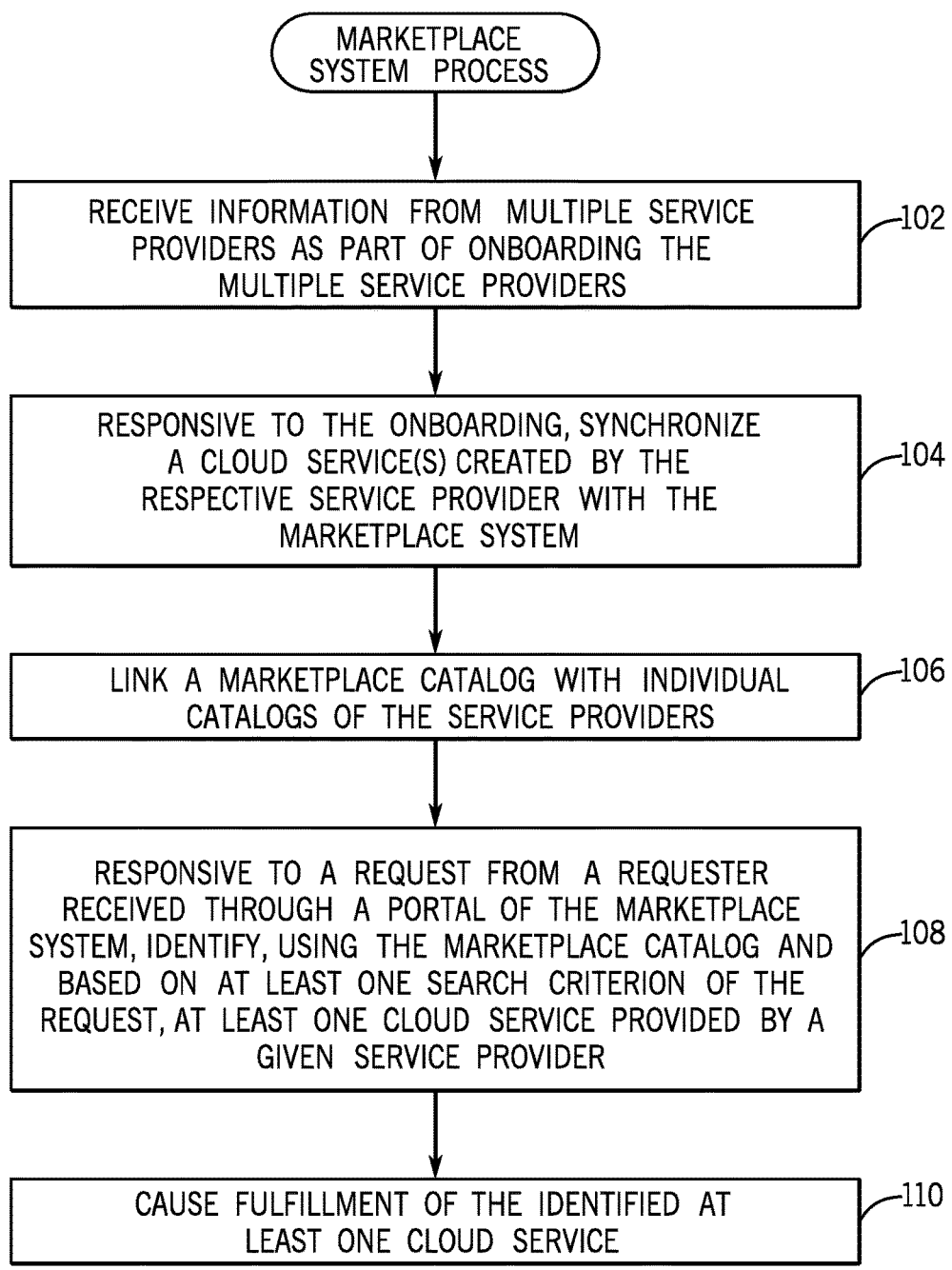
FIG. 1 is a flow diagram of an example process performed by a marketplace system, according to some implementations.

FIG. 1 is a flow diagram of an example process that can be performed by the integrated marketplace system according to some implementations. The "marketplace system" can refer to a system (made up of one or multiple computers, for example) of an integrated marketplace provider. The marketplace system receives (at 102) information from multiple service providers as part of onboarding of the multiple service providers with the marketplace system. The onboarding of each service provider is initiated in response to the service provider signing up with the marketplace system, and the service provider providing information about itself to the marketplace system.

As examples, the received information can include any or some combination of the following: an identity or other information about a service provider; a location where the service provider is located; information, such as a uniform resource locator (URL) or other reference information, of a website and/or catalog of the service provider; information relating to fulfillment of a cloud service provided by the service provider; or any other information that can be used by the marketplace system to perform catalog aggregation, search, and cloud service fulfillment. An individual catalog from a service provider describes respective cloud services offered by the service provider. Catalog aggregation can be performed by the marketplace system to aggregate (i.e. combine) the content of the individual catalogs, to form an aggregate catalog. Example techniques to aggregate catalogs are described in U.S. Publication No. 2015/0161681, entitled "FULFILLING A REQUEST BASED ON CATALOG AGGREGATION AND ORCHESTRATED EXECUTION OF AN END-TO-END PROCESS."

As an example, an administrator of the service provider can sign-up to request participation with the marketplace system by submitting a request and various information of the service provider, which can be included in supporting documents that describe capabilities of the service provider, legal information about the service provider, and so forth. Once the request and supporting information are received from the service provider, the marketplace system can review the received supporting information, and a decision can be made regarding whether or not to approve the service provider. The approval decision can be made manually by an administrator of the marketplace provider, or alternatively, can be automatically made by the marketplace system based on the received supporting information.

Responsive to the onboarding (and more specifically, responsive to approval of each respective service provider), a cloud service (or cloud services) created by the respective service provider is synchronized (at 104) with the marketplace system. In addition, the marketplace system can provide unique login information to each respective service provider that has been approved (the login information can include login information for personnel of the respective service provider), so that the respective service provider (or its personnel) can login to the marketplace system to perform registration with the marketplace system, as discussed further below.

In some examples, in response to onboarding each respective service provider, the marketplace system downloads a package to the respective service provider, where the downloaded package creates and synchronizes the cloud service (or cloud services) created by the respective service provider with the marketplace system.

The downloaded package can allow each respective service provider to create cloud services that can be offered through the marketplace system. In addition, the downloaded package can synchronize the created cloud services with the marketplace system, where "synchronizing" a cloud service with the marketplace system can refer to marketplace system being made aware of the cloud service and being able to offer the cloud service through the marketplace system.

The downloaded package can be in the form of a "gateway" code (including machine-readable instructions), which can include one or multiple tools that are executable by a platform of a service provider. The platform of the service provider can include one or multiple computers.

In other examples, instead of downloading a package to a respective service provider, it is also possible for a service provider to develop its own catalog against the aggregated catalog. In such examples, the individual catalogs of service providers and the aggregate catalog may be synchronized using an aggregation application programming interface (API), such as described in U.S. Publication No. 2015/0161681. Once an individual catalog of a service provider is synchronized with the aggregate catalog, the service provider can use basic tools hosted by marketplace system to manage offerings to synchronize with the aggregate catalog.

The marketplace system further links (at 106) a marketplace catalog (which is the aggregate catalog noted above) with individual catalogs of the service providers that have been onboarded with the marketplace system. The linking includes aggregating content of the individual catalogs into the marketplace catalog. Each individual catalog describes respective cloud services offered by the corresponding service provider. The individual catalogs of different service providers can be dynamically discovered by the marketplace system as the service providers are onboarded. The marketplace catalog can include metadata based on tags of the cloud services offered by the service providers. A tag of a cloud service can include information related to the cloud service, such resources of the cloud service, a location of the cloud service, and other information (discussed further below) like information useful for search (based on a prescribed data model) or for fulfillment of a cloud service.

The metadata can be used during a search for cloud services, to find cloud services that match a request of a requester, and to provide pricing information regarding the cloud services that have been found.

A catalog can include catalog items, where each catalog item can include a collection of information that describes characteristics of a respective cloud service (or cloud services), as well as other information related to the cloud service(s). The catalog can have a predetermined format for information relating to offerings and for some of the metadata, and can include one or multiple documents that contain the corresponding information relating to the cloud service(s). The information describing characteristics of a cloud service in a catalog can describe features of the offering. Other information included in a catalog can any or some combination of the following information: access control information that specifies entities with permission to access the catalog, such as an identity of customers or a class of customers or other entities who are permitted to see and perform actions such as ordering cloud service(s) of the catalog, commercial terms of the cloud service(s) (such as the price or cost of a cloud service, options of the cloud service, as well as other terms), constraints relating to the cloud service(s), and other information. The price can be a non-zero or zero value, and in some examples, the price can be related to an accounting operation of an enterprise. Alternatively, a pointer can be included in the catalog to refer to a system that is able to determine a price or a flow that performs the determination of the price. The information in the catalog can also specify information regarding how the cloud service(s) of the catalog is to be presented in a portal (that presents a user interface)—the user interface (UI) presented by the portal is how customers can view the cloud service(s).

Responsive to the request from the requester received through a portal of the marketplace system, the marketplace system identifies (at 108), using the marketplace catalog and based on at least one search criterion of the request, at least one cloud service provided by a given service provider of the multiple service providers. The request causes the marketplace system to perform a search of the marketplace catalog. In addition to being able to search the marketplace catalog, a customer can also browse the marketplace catalog. The portal of the marketplace system can provide an interface through which customers (individual users or tenants such as enterprises that include multiple users) can access the marketplace system to search for offered cloud services (from the multiple service providers that have been onboarded to the marketplace system). The portal can cause presentation of a UI at a device of a customer, where the UI allows the customer to submit a request to the marketplace system. The device of the customer can include a desktop computer, a notebook computer, a tablet computer, a smart phone, or any other electronic device. Note that different users with different roles in different organizations or from different tenants can view different subsets of the marketplace catalog and possibly different processes.

The marketplace system can cause (at 110) fulfillment of the request, where the fulfillment includes provisioning, to the requester, cloud resources of the identified at least one cloud service for access by the requester.

The fulfillment of the request can be accomplished using one of several different techniques. In one type of technique (indirect fulfillment technique), the fulfillment of the request can be accomplished by redirecting the requester to a given service provider of the identified at least one offering so that the given service provider can fulfill the request. When each service provider provides an offering (referred to as an "abstract offering" as discussed further below) that is related to a cloud service to the marketplace system, the service provider can also provide, as an attribute of the offering, a reference (e.g. a pointer or any other information that allows a respective cloud service to be located) to the cloud service. The pointer can include a uniform resource locator (URL) that refers to a location of the cloud service, which can be accessible over a network (e.g. Internet or other network). In other examples, the reference can include an Internet Protocol (IP) address or any other type of identifier. In examples where the reference is a URL, the requester can be directed to the URL, which can direct the requester to a portal of the given service provider of the identified at least one offering that matches the request. The requester can then use the requester's credentials (e.g. login information) to access the service provider's portal to request access to the identified cloud service.

In another type of technique of fulfilling the request, the fulfillment of the request can be accomplished by performing direct fulfillment of the request by the marketplace system on behalf of the given service provider of the identified at least one offering that matches the request. The direct fulfillment by the marketplace system can be accomplished in one of several ways, including those discussed above according to some examples.

A first direct fulfillment technique involves a service controller at the marketplace system performing a remote fulfillment of the requested cloud service. An example of a service controller is a Cloud Service Automation (CSA) controller from Hewlett-Packard (HP), such as CSA Release 4.5. Although reference is made to the CSA controller as an example of a service controller, it is noted that other different service controllers can be employed in other implementations. The service controller can be used to provision a cloud service on demand, and subsequently, to manage the cloud service during execution of the cloud service.

A second direct fulfillment technique involves using a reference to a cloud service (e.g. in the form of a pointer such as a URL) to call, by the marketplace system, an application programming interface (API) to provision the cloud service. A call to the API by the marketplace system causes a service controller at a platform of the service provider to be invoked. In some examples, the service controller can be created by the downloaded package (in the form of a gateway code, for example) that has been provided from the marketplace system to a respective service provider's platform.

With the direct fulfillment technique discussed above to perform fulfillment on behalf of a requester, management and authentication of the requester by the marketplace system is performed, which in some examples can be accomplished by performing a single sign-on with the different cloud service providers that have been onboarded with the marketplace system.

Figure 2:
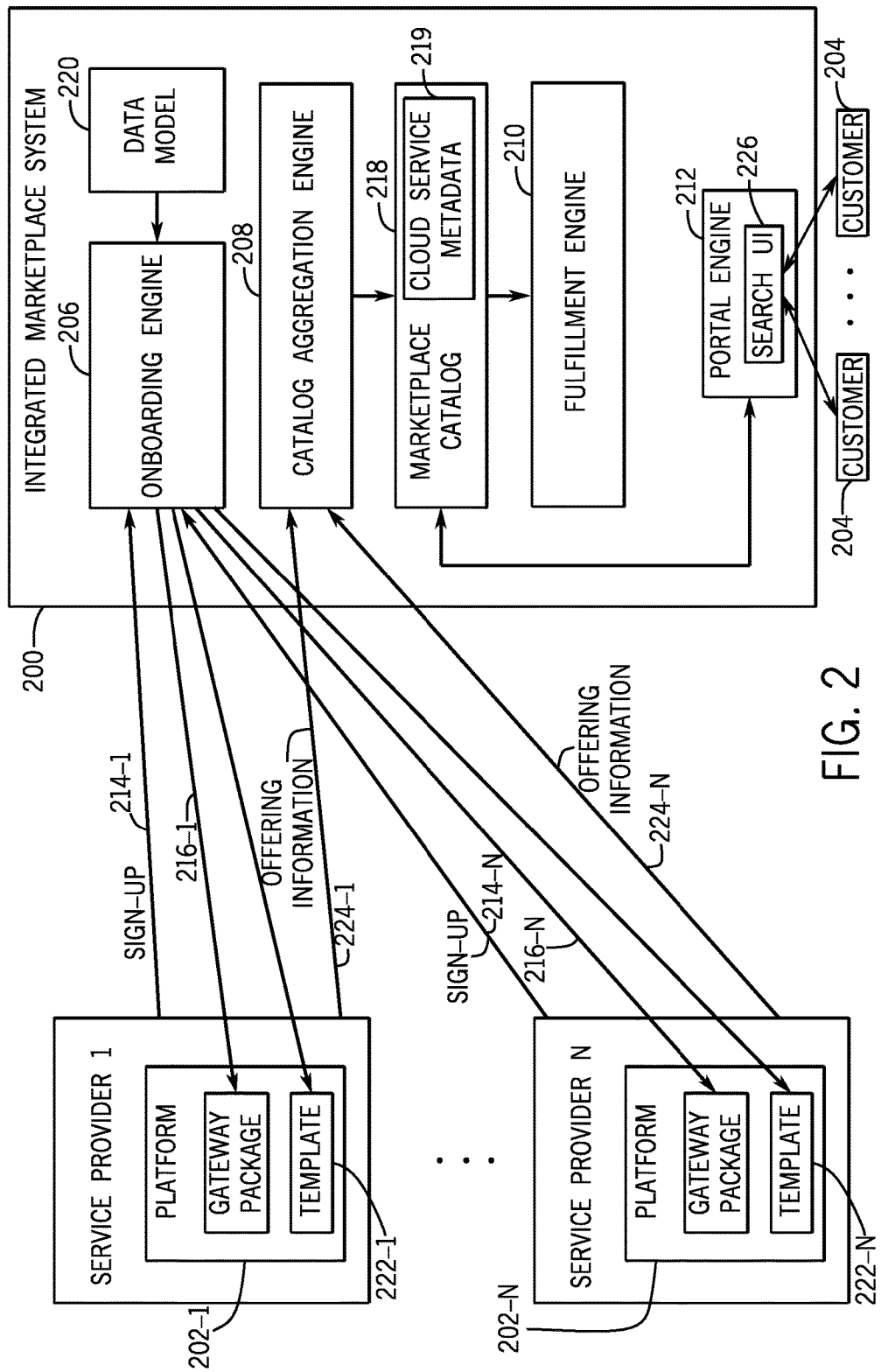
FIG. 2 is a block diagram of an example arrangement including service providers and a marketplace system according to some implementations.

FIG. 2 is a block diagram of an example arrangement that includes an integrated marketplace system 200 according to some implementations of the present disclosure. The example arrangement of FIG. 2 also includes various service providers (1 to N, N>1), where each service provider is associated with a respective service provider platform 202-1 to 202-N (which can be implemented with one or multiple computers and can include various cloud resources useable to provide cloud services to customers 204).

The marketplace system 200 includes an onboarding engine 206, a catalog aggregation engine 208, a fulfillment engine 210, and a portal engine 212. An "engine" can include processing hardware, such as a microprocessor, a core of a multi-core microprocessor, a microcontroller, a programmable gate array (PGA), an application specific integrated circuit (ASIC), or any other processing hardware. An "engine" can include just the processing hardware, or a combination of the processing hardware and machine-readable instructions executable on the processing hardware.

The onboarding engine 206 manages the onboarding, including sign-up, by each of the service providers 1 to N, as discussed above in connection with task 102 of FIG. 1. As shown in FIG. 2, each service provider 1 to N can perform a respective sign-up process 214-1 to 214-N, respectively, with the onboarding engine 206. As discussed above, as part of the sign-ups, the service providers 1 to N provide various information regarding the service providers to the onboarding engine 206, which is useable to determine whether or not each respective service provider is approved to be onboarded to the marketplace system 200.

In some examples, the onboarding engine 206 can provide a web page or a web application at the marketplace system 200. The web page or web application can be used to perform onboarding of a new service provider. In further examples, the onboarding engine 206 can perform onboarding of users (e.g. customers 204) of the marketplace system 200 (such as in cases where direct fulfillment can be performed). To onboard a user, the user signs up with the onboarding engine 206, and the user can be provided with a user identifier and other credentials to provide identity management.

Responsive to the approval of the service providers 1 to N by an administrator or by the onboarding engine 206, the onboarding engine 206 can download (206-1 to 206-N) gateway packages to the respective platforms 202-1 to 202-N of the service providers 1 to N. The downloaded gateway packages include the packages downloaded according to task 104 discussed above.

Each gateway package can create and synchronize cloud services) of the respective service providers with the marketplace system 200. Also, as noted above, each gateway package can cause creation of a service controller at the service provider platform in some examples.

Note that the downloading of the gateway packages is performed in some implementations, but may be omitted in other implementations. In such latter implementations, code already provided at the service providers can interact with the marketplace system 200.

As noted above, the marketplace system 200 can provide unique login information to each respective service provider that has been approved, so that the respective service provider can login to the marketplace system to perform registration with the marketplace system 200. As part of the registration, each service provider logs in, using its unique login information, with the marketplace system 200 and registers information about a gateway produced by a respective downloaded gateway package installed at the corresponding service provider platform. The gateway that is produced by the respective downloaded gateway package can include one or multiple tools, such as a tool to create and synchronize cloud services, and/or the service controller discussed above. The registered information for the gateway can include an address (e.g. IP address) of the gateway, identifiers of catalogs of the service provider that are to be aggregated into a marketplace catalog 218, and other information.

Associated with the registration by the service providers is the dynamic discovery of the individual catalogs of the service providers by the marketplace system 200. The marketplace system 200 can identify the individual catalogs of the service providers, which can then be provided to the catalog aggregation engine 208 to aggregate the content of the individual catalogs, as discussed below.

In response to the registered information from each given service provider, the onboarding engine 206 accesses a data model 220 (also referred to as a marketplace data model) stored in the marketplace system 200 to provide information, based on the data model 220, to the given service provider. In some examples, the onboarding engine 206 can send template 222-1 to 222-N to the respective service providers 1 to N.

The templates 222-1 to 222-N are based on a current active version of the data model. Each service provider can create offerings (relating to cloud services) based on the respective template received from the marketplace system 200. The offerings are "abstract" offerings. An "abstract offering" from a service provider is not actually the real cloud service provided by the service provider, but rather a representation of the cloud service. The attributes (also referred to tags) of the representation of the cloud service include attributes of the data model 220. Information 224-1 to 224-N relating to the abstract offerings can be provided by the respective service providers 1 to N. The information 224-1 to 224-N relating to the offerings can include the tags of each abstract offering.

The attributes of the data model 220 can include any or some combination of the following attributes. Generally, in some implementations, attributes can include functional attributes, operational attributes, and non-functional attributes. A functional attributes can refer to a definition of the offering itself, for example, a virtual machine, a processor, a memory, and so forth. An operational attribute can relate to fulfillment of an offering, such as data (a URL, etc.) to be used to instantiate an offering. A non-functional attribute can express a property an offering or service provider, such as the jurisdiction of the service provider, a certification of the service provider or offering, a (geo-)location of the service provider or offering, a service level agreement (SLA), and so forth.

In other implementations, attributes can be defined in a different manner, such as in the following manner. A fulfillment attribute is related to resources being provided by the service provider. For example, a fulfillment attribute for a server computer (a type of resource) can include a number of microprocessor cores and/or a capacity of a memory. A fulfillment attribute for a communication node (another type of resource) can include a bandwidth of the communication node. A fulfillment attribute for a microprocessor (another type of resource) can indicate a operational frequency of the microprocessor. Other example fulfillment attributes can be provided for other resources.

Another attribute of the data model 220 is a spatial attribute, which can indicate a location of datacenter where a service provider can implement resources for cloud services. The spatial attribute can be expressed as a distance (e.g. distance from the location of a requester and the location of the datacenter).

A further attribute of the data model 220 is a service level attribute that describes a service level agreement (SLA) associated with a cloud service and/or a capacity of the cloud service. An SLA can specify a target service level that the cloud service is to meet. A capacity of the cloud service can refer to a capacity of the cloud service to perform processing (e.g. the amount of data that the cloud service can process within a time interval, a rate of processing, etc.).

Another attribute of the data model 220 is a attribute that can identify a location of a service provider, or a jurisdiction (e.g. country, state, province, etc.) of the service provider. This other attribute can also include information pertaining to a certification of the service provider with a relevant government agency.

A policy attribute of the data model 220 specifies a policy governing a cloud service provided by a service provider. For example, a policy can refer to a policy dictated by a government agency or jurisdiction, a policy dictated by an enterprise, and so forth. A policy can also specify information that an instance of a cloud service is to comply with, such that the policy can be used for policy-guided fulfillment.

As discussed further below, the attributes of the data model 220 are useable to perform search and ranking of cloud services identified in response to requests from requesters (e.g. the customers 204) submitted to the marketplace system 200.

In response to the information 224-1 to 224-N regarding offerings are received by the marketplace system 200 and information identifying individual catalogs of the service providers 1 to N, the catalog aggregation engine 208 can aggregate the contents of the individual catalogs into the marketplace catalog 218. Aggregating the content of an individual catalog into the marketplace catalog 218 can refer to adding the content of the individual catalog into the marketplace catalog 218. Example techniques of aggregating catalogs into an aggregate catalog are provided in U.S. Publication No. 2015/0161681. As additional information is received from a service provider, the content of the catalog of the service provider can be aggregated into the marketplace catalog 218.

Tags included in the information 224-1 to 224-N relating to the offerings from the service providers 1 to N can be included in cloud service metadata 219 that is part of or otherwise associated with the marketplace catalog 218. The metadata 219 is used during a search of the marketplace catalog 218 to find cloud services that match a request from a requester.

Note that a respective information 224-1 or 224-N regarding an abstract offering can be published by a respective service provider to the marketplace system 200 each time the respective service provider has to make a change in the respective service provider's offered cloud service(s), such as a price change, or fulfillment change, or a change to any of the attributes of the data model 220 noted above. Such changes can cause the cloud service metadata 219 of the marketplace catalog 218 to be updated.

In addition, in response to a change of the data model 220 to a new version, the marketplace system 200 can provide to the service providers 1 to N, information relating to the new version of the data model 220, including any changes in the attributes of the data model 220. In response to receiving the information regarding the change of the data model 220, the service providers 1 to N can update their abstract offerings and can send updated information 224-1 to 224-N for the updated abstract offerings to the marketplace system 200.

The portal engine 212 can provide a search-and-rank feature according to some implementations of the present disclosure. The portal engine 212 can present a search UI 226, which can be provided to and displayed at the device of each requester (e.g. customer 204).

The search UI 226 includes fields in which a customer 204 can enter search criteria for a cloud service. In response to activation of a control button (or other UI element) in the search UI 226, a request is generated by the search UI 226 and submitted to the portal engine 212, which performs a search using the entered search criterion (or search criteria) against the cloud service metadata 219 of the marketplace catalog 218. The search criterion (or search criteria) can include any of the attributes of the data model 220 discussed above, and/or any other attribute. For example, attributes applicable to the order can include a date when the cloud service(s) is (are) to be provided (e.g. start and end dates), a total maximum price the customer 204 is willing to pay (across the service duration for the order), any preferences regarding service providers (e.g. an include list of one or multiple service providers preferred by the customer 204, or an exclude list of one or multiple service providers not preferred by the customer 204).

Identified cloud services responsive to the request can be presented to a customer 204 in the search UI 226. The search performed by the portal engine 212 can identify individual cloud services or bundles of cloud services that match the search criterion (or search criteria) of the request.

The customer 204 can select, from among the identified cloud services, the cloud service(s) of interest to the customer 204, which causes an electronic shopping cart to be populated with the selected cloud service(s). In some examples, a cloud service(s) dependent upon the selected cloud service(s) can also be suggested to the customer 204. The customer 204 can then checkout from the shopping cart.

In some implementations, the portal engine 212 can also rank the identified cloud services that match the request. Each identified cloud service can be assigned a rank indication, e.g. a value indicating the closeness of the identified cloud service to the search criterion (or search criteria).

In response to checkout from the shopping cart, information identifying the checked out cloud service(s) can be provided to the fulfillment engine 210, which can cause fulfillment of the request for the checked out cloud service(s), using one of the several fulfillment techniques discussed above. Although not shown in FIG. 2, if an indirect fulfillment technique is used, then the fulfillment engine 210 can redirect the requester to the portal of the respective service provider.

Figure 3:
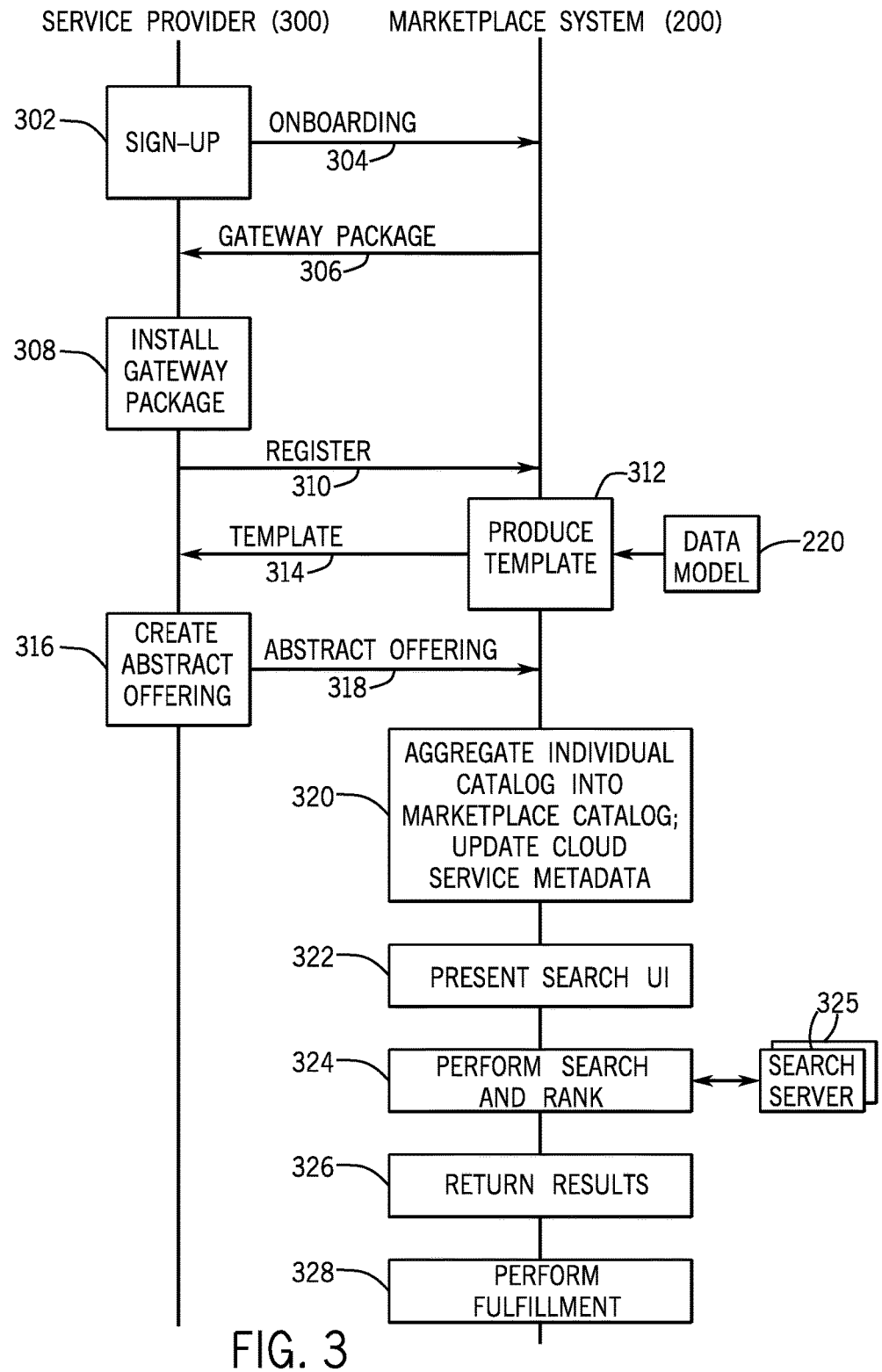
FIG. 3 is a flow diagram of an example process including tasks performed by a service provider and a marketplace system according to some implementations.

FIG. 3 is a flow diagram of processes of a service provider 300 and of the marketplace system 200, according to further implementations. Details regarding various tasks of FIG. 3 have been discussed further above.

The service provider 300 performs sign-up (at 302), to perform onboarding (at 304) with the marketplace system 200. In response to the onboarding, the marketplace system 200 downloads (at 306) a gateway package to the service provider 300. The service provider 300 installs (at 308) the downloaded gateway package at the service provider platform of the service provider. In other implementations, the downloading of the package is not performed; rather, the service provider 300 can connect its individual catalog to the marketplace catalog.

The service provider 300 registers (at 310) with the marketplace system 200. The registering causes performance of a registration process as discussed further above. Note that the registration can be performed prior to the download and install tasks (306 and 308 in FIG. 3).

Using the data model 220, the marketplace system 200 produces (at 312) a template, which is sent (at 314) to the service provider 300. Note that the data model 220 can be created by an administrator of the marketplace system 200. The created data model can be one of two types, in some examples: (1) a first type that provides an attribute of a new cloud service, or (2) a second type that updates an attribute of an existing cloud service. The template can define a standard set of information data, metadata, and/or attributes that can be used to describe different kinds of abstract offerings. A template can also be referred to as a service taxonomy definition. Service providers can use the same set of templates to enable comparison between offerings.

The service provider 300 creates (at 316) an abstract offering based on the template, and the abstract offering is sent (at 318) to the marketplace system 200. Using the registration information and the information of the abstract offering, the marketplace system 200 aggregates (at 320) an individual catalog of the service provider 300 into the marketplace catalog (218 in FIG. 2) and updates the cloud service metadata (219 in FIG. 2).

The marketplace system 200 presents (at 322) a search UI (e.g. 226 in FIG. 2), through which a requester can submit a request for a cloud service. In response to the request, the marketplace system 200 performs (at 324) a search and rank process. In some examples, the search and rank process can be performed by a separate search server computer 325 (or multiple separate search server computers 325). A separate search server computer 325 can refer to a search server computer that is separate from the platform of the marketplace system 200. In some examples, a separate search server 325 can be a plug-in server computer to the marketplace system 200. A plug-in server computer can refer to a server computer that can be selectively and dynamically made available (added) to the marketplace system 200. The dynamic plug-in feature of search server computers allows for a scalable search deployment where additional search processing resources can be provided to the marketplace system 200 in response to demand.

Results of the search and rank process are returned (at 326) by the marketplace system 200. In some examples, the search results can be evolving search results that can become eventually consistent over time. In other words, the user experiences an interactive response as the search results are returned. In the beginning, the user may see raw un-ranked search results. As the ranking is performed, the search results may be re-ordered, such that the search results the user sees initially may be different from the search results after the search and rank has completed. In this way, the user can get instant feedback instead of waiting for the overall search and rank process to be concluded.

Based on selections of cloud services in the results made by the requester, the marketplace system 200 can then perform fulfillment (at 328) of the selected cloud service(s), using either the indirect or direct fulfillment techniques discussed above.

The search and rank feature is discussed in further detail below. The search UI (presented at 322) can present a unified view of search criteria to the user. The view can allow the user to first select a resource type (e.g. server or other type of resource), and once the resource type is selected, the view can present the "searchable" attributes for the resource type. For example, if the user selects a server as the resource type, then the UI presents the user with searchable attributes for the server.

In some examples, the searchable attributes can be divided into the following groups, to allow the user to specify search criteria for offerings and/or service providers. In some implementations, the searchable attributes can include functional attributes, operational attributes, and non-functional attributes as discussed above. Functional and non-functional can be tied to both offerings and service providers. For example user can specify the size of a storage device (offering attribute) and that a service provider should be certified (service provider attribute). In addition, a user may specify price and dates. Service provider attributes can be derived from the registration process of the service providers.

In other implementations, the searchable attributes can be defined as follows. A first group of attributes includes deployment attributes that relate to the type of resource, such as CPU, memory, etc. on which a cloud service can be provided. A second group of attributes includes spatial attributes, such as a geographic location of deployment, a jurisdiction of a service provider, and so forth. A third group of attributes includes SLA attributes, such as performance, uptime, and so forth. A fourth group of attributes includes pricing attributes relating to a price of a resource. In further examples, additional or alternative groups of attributes can be provided.

A user can select one or multiple attributes, and related value(s), and can associate priorities with each selected attribute.

Once the search data (including selected attributes and priorities, for example) is received through the search UI, the search data is passed to the task (324) of performing search and rank.

Prior to performing the search and rank, the search data can be normalized or otherwise preconditioned. A search on available offerings from the aggregate catalog is performed to produce search results. Based on matched attributes and priorities assigned to respective attributes, a ranking of the individual items of the search results can be performed. The rank assigned to each item of the search results can include a number in a sequence of numbers, where successive numbers indicate different ranks. Other rank values can be used in other examples.

Next, the rank value (e.g. number) for each item of the search results can be normalized, such as to a scale of 100 or other specified value. For example, a value of 100 can reflect an exact match. It may be possible for the normalized rank value to exceed 100, such as where an item of the search results has more features than the user asked for. The rank of an item in the search results that has less than exact match is normalized to a value less than 100 in this example, indicating that this item has less features than what the user asked for. The normalization can be performed on a sliding scale, with 100 (or some other specified value) selected to indicate an exact match.

The items of the search results can be sorted based on the normalized rank values. An item (or items) having a normalized rank value indicating an exact match can be listed first, followed by item(s) with a normalized rank value exceeding the specified value (e.g. 100), and then followed by item(s) with a normalized rank value less than the specified value (e.g. 100).

The sorted items of the search results can be output at 326 in FIG. 3.

As noted above, since the search and rank tasks can be computational intensive, such search and rank tasks can be executed on a separate server computer (or server computers) 325, or more generally, separate processing and storage resources. If there are multiple concurrent requests from multiple customers at the marketplace system 200, then the search server computers 325 can perform concurrent processing, to allow for scalability in response to increase in requested workload.

As noted above, the search results presented to the user can become eventually consistent. For example, the user may initially be presented with the raw search results (i.e. un-ranked). The search server(s) 325 can present search result items (initially raw search results) as they are identified to the user. However, as the ranking is applied to the search result items, the order in which the search result items are presented can be changed and sorted based on normalized rank values as discussed above. The re-sorting of the search result items can be automatically updated as the normalized rank values become available. The search results presented can be modified to take into account the rankings, such that the search results become eventually consistent. In this manner, the search results can be returned to a user relatively quickly, and the search results can be dynamically updated as the search and rank function fine tunes the search result set.

Figure 4:
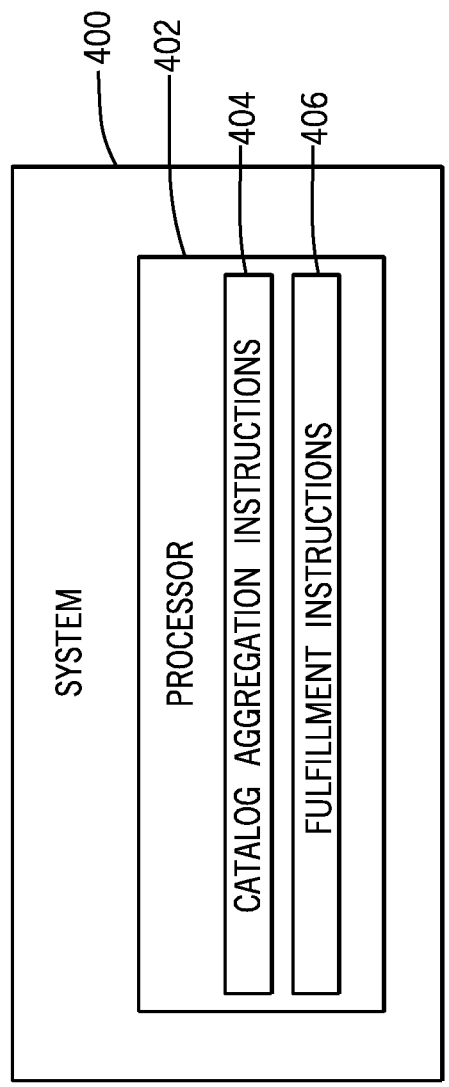

FIG. 4 is a block diagram of an example system 400 according to some implementations. The system 400 can be the marketplace system 200 discussed above, or alternatively, the system 400 can be different from the marketplace system 200. The system 400 includes a processor (or multiple processors) 402. A processor can include a microprocessor, a core of a multi-core microprocessor, a microcontroller, a programmable gate array (PGA), an application specific integrated circuit (ASIC) device, or another processing hardware.

The processor(s) 402 can execute catalog aggregation instructions 404 (e.g. instructions of the catalog aggregation engine 208) to dynamically discover individual catalogs of service providers, and to aggregate the discovered individual catalogs into an aggregate catalog, and fulfillment instructions 406 (e.g. instructions of the fulfillment engine 210) to fulfill a request for a cloud service, the request for the cloud service received from a requester. The catalog aggregation instructions 404 can receive a new catalog of a service provider, and aggregate the new catalog into the aggregate catalog. The catalog aggregation instructions 404 can also receive registration of a catalog of a service provider (such as during registration of the service provider as part of onboarding), and aggregate the registered catalog into the aggregate catalog.

FIG. 5 is a block diagram of a further example of the marketplace system 200 that includes a non-transitory machine-readable or computer-readable storage medium (or storage media) 502. The storage medium (or storage media) 502 can store various machine-readable instructions that are executable in the marketplace system 200 to perform respective tasks.

For example, the machine-readable instructions can include existing marketplace catalog providing instructions 504 that provide an existing marketplace catalog that includes contents of individual catalogs of multiple service providers.

The machine-readable instructions further include catalog aggregating instructions 506 to, in response to onboarding of a new service provider, aggregate a content of an individual catalog of the new service provider into the existing marketplace catalog.

The machine-readable instructions further include portal instructions 508 to present, through a portal, information about cloud services offered by service providers including the multiple service providers and the new service provider, where the information is based on the marketplace catalog. The portal instructions 508 also receive, through the portal from a requester, a request including at least one search criterion for cloud services.

The machine-readable instructions further include search instructions 510 to perform a search in response to the request to identify at least one cloud service based on the at least one search criterion of the request. The machine-readable instructions further include fulfillment instructions 512 to cause fulfillment of the identified at least one cloud service.

A storage medium (or storage media) can include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
   receiving information from a plurality of service providers as part of onboarding of the plurality of service providers with a marketplace system, wherein the marketplace system provides login information to each respective service provider;
   responsive to the onboarding, synchronizing a cloud service created by the respective service provider with the marketplace system;
   linking a marketplace catalog with catalogs of the plurality of service providers, the linking comprising aggregating content of the catalogs into the marketplace catalog, the catalogs describing respective cloud services offered by the service providers, the marketplace catalog comprising metadata based on tags of the cloud services offered by the service providers;
   responsive to a request from a requester received through a portal of the marketplace system, identifying, using the marketplace catalog and based on at least one search criterion of the request, at least one cloud service provided by a given service provider of the plurality of service providers;
   causing fulfillment of the request, the fulfillment comprising provisioning resources of the identified at least one cloud service;
   providing to the plurality of service providers, information relating to a data model, wherein the plurality of attributes of the data model comprise a spatial attribute relating to a location of the resources; and
   responsive to the onboarding of the plurality of service providers, downloading a package to each respective service provider of the plurality of service providers, the package to create and synchronize the cloud service of the respective service provider with the marketplace system.

2. The method of claim 1, wherein causing the fulfillment of the request comprises redirecting the requester to a portal of the given service provider of the identified at least one cloud service so that the given service provider can fulfill the request.

3. The method of claim 1, wherein causing the fulfillment of the request comprises performing direct fulfillment of the request by the marketplace system on behalf of the given service provider of the identified at least one cloud service.

4. The method of claim 1, further comprising:
   receiving, by the marketplace system from the plurality of service providers, offerings related to the cloud services, the received offerings based on the data model.

5. The method of claim 4, wherein the data model comprises a plurality of attributes, the method further comprising:
   using the plurality of attributes of the data model in searching the marketplace catalog for cloud services that match the at least one criterion of the request from the requester, and ranking the cloud services that match the at least one criterion.

6. The method of claim 5, wherein the plurality of attributes of the data model further comprise attributes selected from among a fulfillment attribute relating to resources for the cloud services offered by a respective service provider, a service level attribute relating to a service level agreement or a capacity of the cloud services offered by the respective service provider, an attribute regarding a location or jurisdiction of the respective service provider, and a policy attribute relating to a policy of the respective service provider.

7. The method of claim 4, further comprising:
   in response to a change of the data model to a new version, providing, by the marketplace system to the plurality of service providers, information relating to the new version of the data model;
   receiving, by the marketplace system from the plurality of service providers, updated offerings comprising the cloud services, the updated offerings based on the new version of the data model; and
   updating the metadata of the marketplace catalog responsive to the updated offerings.

8. The method of claim 4, wherein receiving the offerings comprises receiving, by the marketplace system from each respective service provider of the plurality of service providers, an abstract offering including information relating to a capability of a respective cloud service offered by the respective service provider, and a pointer to the respective cloud service, the method further comprising:
   in response to the request being for a given cloud service, redirecting, by the marketplace system, the requester to a pointer in the abstract offering corresponding to the given cloud service to fulfill the request.

9. The method of claim 4, wherein the data model is to provide an attribute of a new cloud service, or to update an attribute of an existing cloud service.

10. The method of claim 1, wherein the package downloaded to each respective service provider of the plurality of service providers comprises machine-readable instructions that upon execution cause creation of the service controller at a platform of the respective service provider to provision and manage cloud services.

11. The method of claim 1, further comprising:
ranking cloud services identified by a search performed in response to the request, the ranking using user-selected attributes and priorities assigned to the user-selected attributes,
wherein the searching and the ranking are performed by invoking a separate search server computer that is dynamically added to the marketplace system.

12. The method of claim 11, wherein the invoked separate search server computer is to provide search results in response to the request that eventually become consistent.

13. The method of claim 1, further comprising onboarding, at the marketplace system, customers of the marketplace system.

14. The method of claim 1, wherein the onboarding of the plurality of service providers comprises:
receiving, by the marketplace system, requests to sign up the plurality of service providers;
receiving, by the marketplace system, information of the plurality of service providers; and
providing, by the marketplace system, an indication of whether or not each respective service provider of the plurality of service of providers has been approved based on the received information.

15. The method of claim 1, wherein the method is performed by a computer system comprising a hardware processor.

16. A system comprising:
a processor; and
a non-transitory storage medium storing instructions executable on the processor to:
as part of onboarding of a plurality of service providers with the system:
provide information relating to a data model, wherein providing the information comprises sending, to the plurality of service providers, templates based on the data model and wherein the data model comprise a spatial attribute relating to a location of the resources, and
receive information of cloud services, based on the templates, from the plurality of service providers;
responsive to the onboarding, synchronize a cloud service created by each respective service provider of the plurality of service providers with the system;
link a marketplace catalog with catalogs of the plurality of service providers, the linking comprising aggregating content of the catalogs into the marketplace catalog, the catalogs describing respective cloud services offered by the service providers;
responsive to a request from a requester received through a portal of the marketplace system, identify, using the marketplace catalog and based on at least one search criterion of the request, at least one cloud service provided by a given service provider of the plurality of service providers, wherein the marketplace system provides login information to each respective service provider; and
cause fulfillment of the request, the fulfillment comprising provisioning, to the requester, hardware and software resources of the identified at least one cloud service, the provisioned hardware and software resources of the identified at least one cloud service deploying an application.

17. The system of claim 16, wherein the instructions are executable on the processor to:
receive a new catalog of a service provider, and
aggregate the new catalog into the marketplace catalog.

18. The system of claim 16, wherein the instructions are executable on the processor to:
receive registration of a catalog of a service provider, and
aggregate the registered catalog into the marketplace catalog.

19. An article comprising at least one non-transitory machine-readable storage medium storing instructions that upon execution cause a marketplace system to:
responsive to onboarding of a plurality of service providers with the marketplace system, download a package to each respective service provider of the plurality of service providers, the package to create and synchronize a cloud service of the respective service provider with the marketplace system, wherein the marketplace system is to provide login information to each respective service provider;
provide a marketplace catalog that includes contents of individual catalogs of the plurality of service providers;
in response to onboarding of a new service provider, aggregate a content of an individual catalog of the new service provider into the marketplace catalog;
present, through a portal, information about cloud services offered by service providers including the plurality of service providers and the new service provider, the information based on the marketplace catalog;
receive, through the portal, a request including at least one search criterion for cloud services;
perform a search in response to the request to identify at least one cloud service based on the at least one search criterion of the request;
provide information relating to a data model, wherein the data model comprises a spatial attribute relating to a location of the resources; and
cause fulfillment of the identified at least one cloud service, the fulfillment of the at least one cloud service comprising provisioning hardware and software resources of the at least one cloud service that deploys an application.

20. The article of claim 19, wherein the searching is performed using at least one of plug-in search server computers that provide scalable search in response to requests from requesters.

21. The article of claim 19, wherein the package downloaded to each respective service provider comprises machine-readable instructions that upon execution creates and synchronizes the cloud service of the respective service provider with the marketplace system.

* * * * *